(12) United States Patent
Balaraman et al.

(10) Patent No.: US 11,954,160 B2
(45) Date of Patent: Apr. 9, 2024

(54) PERSONALIZATION USING CLICKSTREAM DATA

(71) Applicant: AMERICAN EXPRESS TRAVEL RELATED SERVICES COMPANY, INC., New York, NY (US)

(72) Inventors: Balaji Balaraman, Bangalore (IN); Sastry V S M Durvasula, Phoenix, AZ (US); Sathish B. Muthukrishnan, Phoenix, AZ (US); Harish Naik, Phoenix, AZ (US); Neha Singh, Gurgaon (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 941 days.

(21) Appl. No.: 15/588,987

(22) Filed: May 8, 2017

(65) Prior Publication Data

US 2018/0322205 A1    Nov. 8, 2018

(51) Int. Cl.
*G06F 16/9535* (2019.01)
*G06F 16/955* (2019.01)
*G06F 40/106* (2020.01)
*G06F 40/134* (2020.01)

(52) U.S. Cl.
CPC ...... *G06F 16/9535* (2019.01); *G06F 16/9558* (2019.01); *G06F 40/106* (2020.01); *G06F 40/134* (2020.01)

(58) Field of Classification Search
CPC ........... G06Q 30/0254; G06Q 30/0623; G06Q 50/01; G06F 16/24578; G06F 16/9535; G06F 16/9558; G06F 16/9537; G06F 16/2457; G06F 16/211; G06F 16/24522; G06F 16/337; G06F 16/951; G06F 16/24545; G06F 16/24556; G06F 16/2255; G06F 16/24575; G06F 16/7867; G06F 16/955
See application file for complete search history.

(56) References Cited

U.S. PATENT DOCUMENTS

| | | | | |
|---|---|---|---|---|
| 8,225,195 | B1* | 7/2012 | Bryar | G06Q 30/0601 715/204 |
| 9,300,728 | B1* | 3/2016 | Ananchaperumal | H04L 67/1001 |
| 9,479,640 | B1* | 10/2016 | Saylor | H04M 3/493 |
| 9,799,081 | B1* | 10/2017 | Lewis | G06Q 50/01 |
| 2008/0162269 | A1* | 7/2008 | Gilbert | G06Q 30/02 705/7.31 |
| 2011/0119593 | A1* | 5/2011 | Jacobson | G06Q 30/02 715/736 |

(Continued)

OTHER PUBLICATIONS

Tony Costa, "Personalization and the rise of individualized experiences", Dec. 9, 2014, pp. 1-17, Forrester Research Inc., Cambridge, MA.

*Primary Examiner* — Vaishali Shah
*Assistant Examiner* — Berhanu Mitiku
(74) *Attorney, Agent, or Firm* — Thomas | Horstemeyer, LLP (57) ABSTRACT

A system may deliver personalized content to a user. The system may create a user persona based on demographic information and stored clickstream data of the user. The system may learn which functionalities the user typically uses on a webpage, and the system may create a personalized version of the webpage for the user.

20 Claims, 4 Drawing Sheets

(56) References Cited

U.S. PATENT DOCUMENTS

| | | | |
|---|---|---|---|
| 2016/0055160 A1* | 2/2016 | Himel | G06F 16/248 |
| | | | 707/728 |
| 2016/0140622 A1* | 5/2016 | Wang | G06F 16/986 |
| | | | 705/14.66 |
| 2017/0061481 A1* | 3/2017 | Wee | G06Q 30/0201 |
| 2017/0192632 A1* | 7/2017 | Lavonen | G06F 3/04845 |
| 2017/0213272 A1* | 7/2017 | Mowatt | G06Q 30/0204 |
| 2017/0345026 A1* | 11/2017 | Iannaccone | G06Q 30/0201 |
| 2018/0151150 A1* | 5/2018 | Volpi | G09G 5/08 |

* cited by examiner

PERSONALIZATION USING CLICKSTREAM DATA

FIELD

The present disclosure relates to computer networks, and more specifically, to systems and methods for delivering personalized content.

BACKGROUND

Individuals interact with the internet via many different devices. The devices interact with individuals via a variety of interfaces, such as touchscreens, voice recognition, keyboards, etc. Businesses often attempt to provide relevant content to the individual on the individual's device. However, it may be difficult for businesses to obtain and to process information about the individual to provide the most relevant content. Additionally, providing customized content takes time and processing power, which can lengthen the time and the cost for the business to provide the relevant content.

SUMMARY

A system, method, and computer readable medium (collectively, "system") for providing personalized content is disclosed. The system may authenticate authentication credentials for a user. The system may calculate, in response to the authenticating, an affinity score of the user. The system may determine, based on the affinity score, to provide personalization services to the user. The system may select, based on clickstream data of the user, a first link corresponding to a first function. The system may present the first link to the user.

In various embodiments, the personalization services are provided in response to the affinity score being above a threshold level. The system may select, based on the clickstream data, a second link corresponding to a second function. The system may determine that the user is more likely to select the first link than the second link. The system may present the first link in a greater size than the second link. The system may determine an available display area on a device of the user and calculate a first size of the first link and a second size of the second link, such that the first link and the second link fill the available display area. The first size may be proportional to a likelihood that the user is going to select the first link, and the second size may be proportional to a likelihood that the user is going to select the second link.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In general, a user may interact with an internet connected device. A variety of devices may be used, such as mobile phones, televisions, computers, voice personal assistants ("VPA"), automobile touch screens, etc. A content provider may provide content to the device, such as on a website or a mobile application. The content provider may be a merchant that owns or operates the website or mobile application.

The content provider may create a user persona for each user that interacts with the content provider. The user persona may include user characteristics including demographics (e.g., age and gender), purchase history, user information (e.g., address, email, and telephone number), clickstream data, or other known data regarding the user.

The content provider may collect and store clickstream data from the user. The clickstream data may include a history of each user's interaction with the content provider, as well as the content provider's responses. For example, the clickstream data may include each link clicked by the user, and whether the response was successful or if an error occurred.

The content provider may utilize the clickstream data and the user persona to provide customized content and webpage versions to the user. For example, the content provider may determine that the user typically visits three different sections of a website, and the content provider may provide links to the three sections on a welcome page to make the sections easily accessible by the user.

Providing customized content may increase the processing load on content provider servers relative to non-customized standard content. The content provider may provide increased levels of customization for frequent users, or high value users, while providing little or no customization for low value users in order to conserve processing power.

Figure 1:
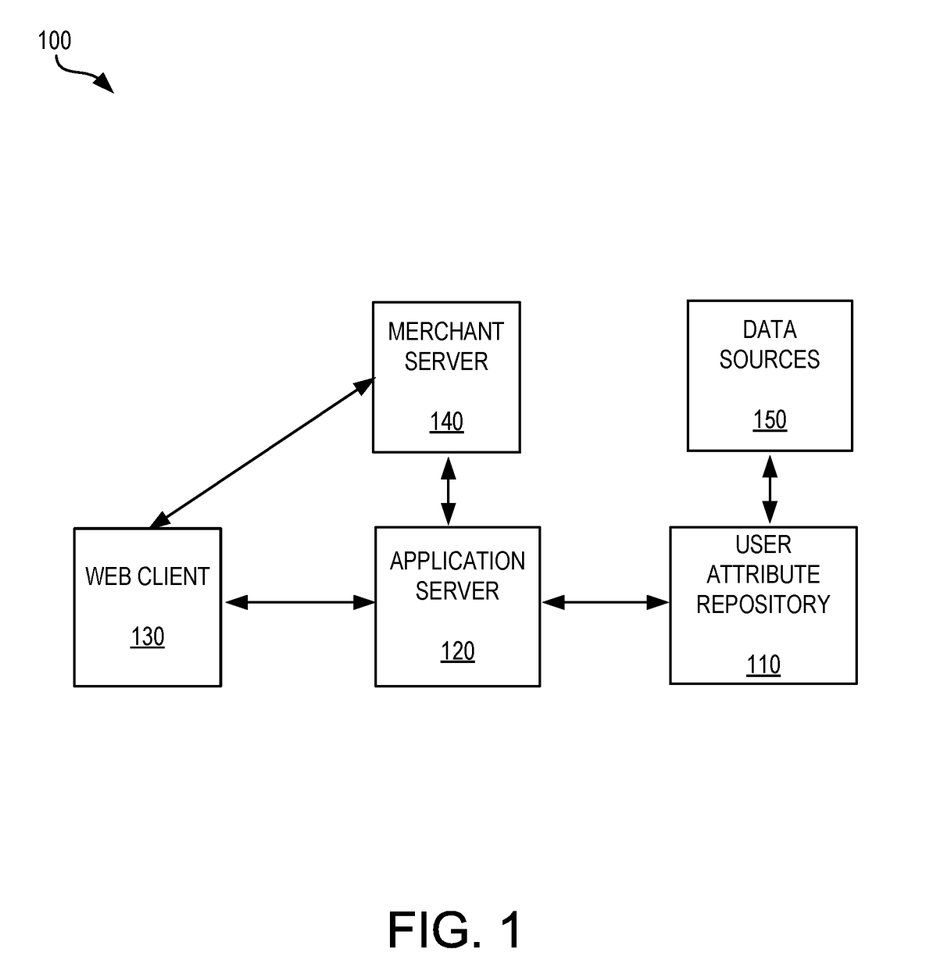
FIG. 1 illustrates various system components of a personalization system, in accordance with various embodiments.

More specifically, referring to FIG. 1, a personalization system 100 is illustrated according to various embodiments.

The personalization system 100 may comprise a user attribute repository 110. The user attribute repository 110 may comprise one or more databases or servers that store information relevant to the user. The information may comprise demographic information. The demographic information may include name, address, age, gender, generation, phone number, email address, social media profiles, etc. The information may comprise behavioral information. The behavioral information may describe how the user interacts with the content provider's products. In the case of a transaction account issuer, this may include the type of transaction account products owned by the user, the mode of acquisition of transaction account products, length of transaction account ownership, annual spend, credit score, etc. The user attribute repository 110 may obtain various data from third-party data sources 150 such as, for example, credit bureaus, governmental databases, private data providers, etc.

The user attribute repository 110 may store clickstream data. The clickstream data may include a log of all of the user's interactions with the content provider. For each channel, such as a website or mobile application, the clickstream data may include the time of access, the actions performed by the user, and the response from the content provider. In various embodiments, the clickstream data may be obtained using clickstream provider software, such as DOUBLE-CLICK, manufactured by Google, Inc., and DOUBLE-CLICK CAMPAIGN MANAGER, manufactured by Adobe Systems, Inc.

The user attribute repository 110 may store contextual data. The data may include recent actions taken by the user such as, for example, websites visited, mobile applications used, geolocation, recent financial transactions, internet search requests, data regarding transactions (e.g., location, date, and time of transaction), present location, past location, proximity sensing data, such as iBeacon® data, amount spent, merchant, frequency of transactions, number of transactions, transaction categorizations, searches, interests, interactions with merchants, travel patterns, search patterns, etc. In various embodiments, the data may be obtained via agreements with third parties such as social media operators.

In various embodiments, context characteristics may comprise an activity in a social media channel (e.g., a Tweet). Examples of social media channels include Facebook®, Foursquare®, Twitter®, MySpace®, LinkedIn®, and the like. In response to activity in the social media channel, various context characteristics may be stored, for example, an individual's comments in a social media channel toward a particular retailer. For example, an individual who comments about retailers in a particular market segment may be of interest to other retailers in that same market segment, and thus this activity may be of interest to store as context characteristics. Similarly, context characteristics may comprise an activity in an entertainment channel (e.g., xBox®) or a review channel (e.g., TripAdvisor®), or activity in a reservation channel (e.g., OpenTable®), or may comprise any activity or combination of activities.

The user attribute repository 110 may comprise any database such as distributed big data systems. Distributed computing systems may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

The personalization system may comprise an application server 120. The application server 120 may provide a graphical user interface ("GUI"), such as a website or mobile application, which allows a consumer to interact with a TAI. For example, the application server 120 may provide a website which allows a consumer to view account statements and make payments. The application server 120 may communicate with the user attribute repository 110 in order to provide account information to the consumer and process payments from the consumer.

The application server 120 may communicate with the user attribute repository 110 to obtain user attributes. Thus, the application server 120 may access the user attribute repository 110 to identify different context characteristics in order to provide various types of users with various personalization services.

A consumer may interact with the system 100 utilizing one or more clients capable of communicating over a network, such as web clients. The consumer may use a web client 130 to initiate transactions, view statements, make payments, and otherwise perform transaction account functions. The web client 130 may interact with the application server 120 in order for the consumer to make payments to the transaction account. In various embodiments, the web client 130 may comprise a mobile application, and the consumer may open the mobile application to interface with the application server 120. In various embodiments, the web client 130 may comprise a touch screen interface, such that consumers may interact with the GUI by contacting the touch screen interface. In various embodiments, the web client 130 may comprise a voice personal assistant ("VPA").

The system 100 may comprise a merchant server 140. The consumer may initiate a transaction with a merchant, and the merchant server 140 may transmit an authorization request to the application server 120. In various embodiments, the authorization request may be transmitted via one or more payment processors. The application server 120 may authorize the transaction and transmit an authorization response to the merchant server 140. The application server 120 may store a record of charge corresponding to the transaction in the user attribute repository 110. On various embodiments, the merchant server 140 may transmit clickstream data to the user attribute repository 110, or the merchant server 140 may transmit clickstream data to the application server 120, which may transmit the clickstream data to the user attribute repository 110 to be stored.

In various embodiments, the user attribute repository 110 may collect and store new data on a daily basis. The user attribute repository 110 may consolidate the available data into a user persona describing the user.

Figure 2:
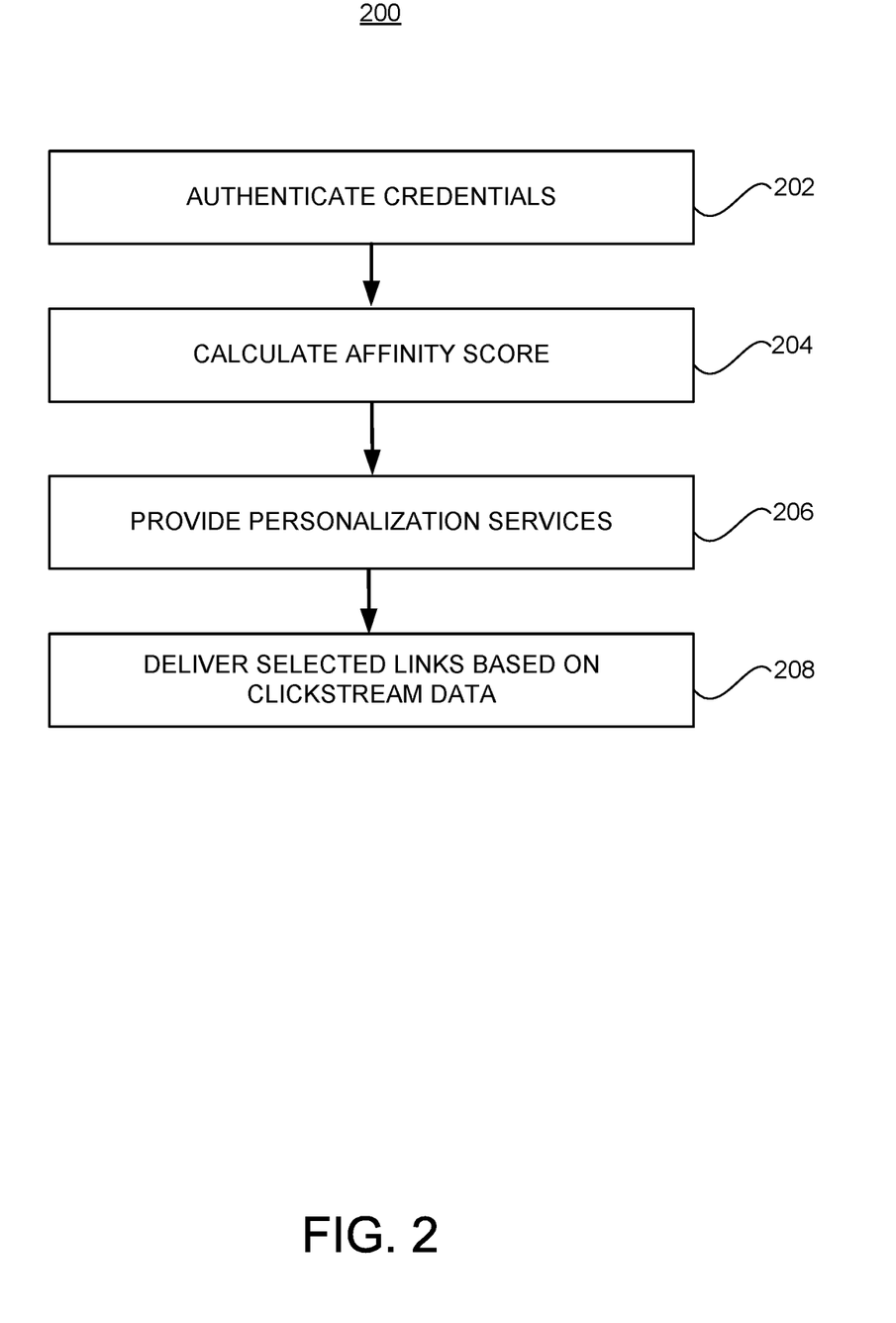
FIG. 2 illustrates a process flow for personalization, in accordance with various embodiments.

Referring to FIG. 2, a flowchart of a process 200 for providing personalized content to a user is illustrated in accordance with various embodiments. The user may access a website or web application provided by a content provider in a personalization system. The user may be prompted to enter authentication credentials, and the personalization system may authenticate the credentials (step 202). The user may log in by providing a user name and password for authentication by the personalization system. The user may also authenticate with the personalization system by providing one or more of a one-time password (OTP), a fingerprint, a facial image, or another suitable user authentication data. The user may also be authenticated with the personalization system using device authentication based on unique identifiers for the user's device, such as device ID, MAC address, telephone number, or other device identifiers.

The personalization system may calculate an affinity score for the user (step 204). The personalization system may use the affinity score to determine whether to provide personalization services to the user. The affinity score may be calculated by leveraging collaborative filtering and neural network and similar algorithms. The affinity score may be continuously updated as data attributes change. The affinity score may be calculated by a variety of factors, including demographic data and clickstream data stored in the user attribute repository. In various embodiments, the factors may include the frequency with which the user visits the content provider's site, the user's spend capability, and the user's average monthly spend. For example, each factor may be given a score (e.g. 1-10), and the scores may be averaged to reach the affinity score. In various embodiments, a score of 9 out of 10 for a given factor may indicate that the user is in the $90^{th}$ percentile of other users with data in the user attribute repository for that given factor.

The personalization system may provide personalization services to the user in response to the affinity score being above a threshold level (step 206). For example, the personalization system may provide personalization services if the user's affinity score is above the $50^{th}$ percentile, the $75^{th}$ percentile, or any other suitable level. In various embodiments, the threshold level may be determined dynamically based upon available processing power. For example, if servers in the personalization system are under high demand, the threshold level may be raised to the $80^{th}$ percentile, and if the processing demand decreases, the threshold level may be decreased to the $20^{th}$ percentile.

In various embodiments, the personalization system may customize the website for the user in a variety of ways. The merchant web site may display a specific product type or product category. The merchant web site may also sort displayed products according to a user preference such as, for example, popularity with users generally, popularity with a user segment, ascending price, or descending price. In various embodiments, the popularity may be based on a frequency with which users select a product or link when presented to the user. The web site may also tailor the look and feel to the user based on user preferences. For example, the user may provide the personalization system with web preferences such as color, text size, image size, items per page, or other browsing preferences. The personalization system may retrieve the preferences and apply the preferences when serving content to the user.

The personalization system may transmit a clickstream event from the application server to the user attribute repository. The clickstream event may include any action by the user, such as clicking on a link or entering authentication credentials. The personalization system may determine a likely next action by the user based on the previously stored clickstream data in the user attribute repository. The personalization system may deliver content allowing the user to select links for the next actions the user is likely to take (step 208).

In various embodiments, the personalization system may determine the size of an available display area of a GUI of the user's device in which the personalization system may provide selectable links which the user is likely to utilize. The user interface design may be template based. The personalization system may provide different templates for phones, tablets, desktop computers, etc. The personalization system may calculate sizes of links or buttons for the user's likely functions, such that the links fill the available space. For example, the personalization system may determine, based on the previously stored clickstream data, that the user is likely to select one of three links. The personalization system may deliver the three links to the user's device to fill the available space. In various embodiments, the size of each link may be proportional to the likelihood that the user is going to select the link.

In various embodiments, the clickstream data may indicate that a user received an error. The personalization system may provide the user with a potential fix, or may open a dialogue box with the consumer. This may preempt the user from calling technical support or ceasing use of the website entirely.

In various embodiments, the context may learn and grow over time and may be modified by the user. For example, as the user's characteristics and the user's persona changes over time, those changes may be integrated into the context. For example, the user may historically redeem loyalty points once per year. Thus, the context may grow to include a predicted loyalty point redemption for the user once per year.

In various embodiments, a user may log into a website on a particular day of the month each month. The user may verify an amount due and pay the bill each time. The personalization system may identify this pattern, and when the user logs in on the same date the following month, the personalization system may present the user with the amount due and the option to pay the bill on the welcome page without requiring the user to click through several pages.

Similarly, in various embodiments each time a user logs in they may review transactions over a threshold value, such as $100.00. The personalization system may identify this pattern, and each time the user logs in the personalization system may present the user with a list of recent transactions over $100.00.

The personalization system may iteratively retrieve personalized content in response to each user action. Each time the user selects a link or inputs data on the user device, the personalization system may store the input as a new data field, and the personalization system may anticipate subsequent user actions. Thus, as a communication session continues, the personalization system may have better information with each action, which allows the personalization system to better predict the next action from the user. The time of the clicks, the device used, the location of the user, or any other action that triggered the user to click are important to continue to enhance the personalization for the user. Each additional event increases the amount of data available to describe the user and increases the accuracy with which the personalization system may provide content.

In various embodiments, the personalization system may transmit content to the user device based on a determination that the user may be interested in the content. Even if the personalization system does not anticipate that a user may request particular content, the personalization system may determine that the user would be likely to appreciate or respond to certain content based on the stored data fields or other information about the user and/or other users. For example, the personalization system may determine that other users with similar personas often respond to an offer for a short term loan, and the personalization system may present an offer for a short term loan to the user, even if the user has never indicated a desire for a short term loan. Thus, the personalization system may provide desirable content to the user, even without the user specifically requesting such content.

In various embodiments, the anticipated user actions may be based at least partially on a variety of data entries associated with other users. The personalization system may evaluate the action from the user and the data entries associated with the user, and the personalization system may compare this information with data entries of other users and the subsequent action of the other users with similar data entries. The personalization system may determine that other users with similar data entries often make a particular subsequent action, and the personalization system may anticipate that the user will make the same action.

Figure 3:
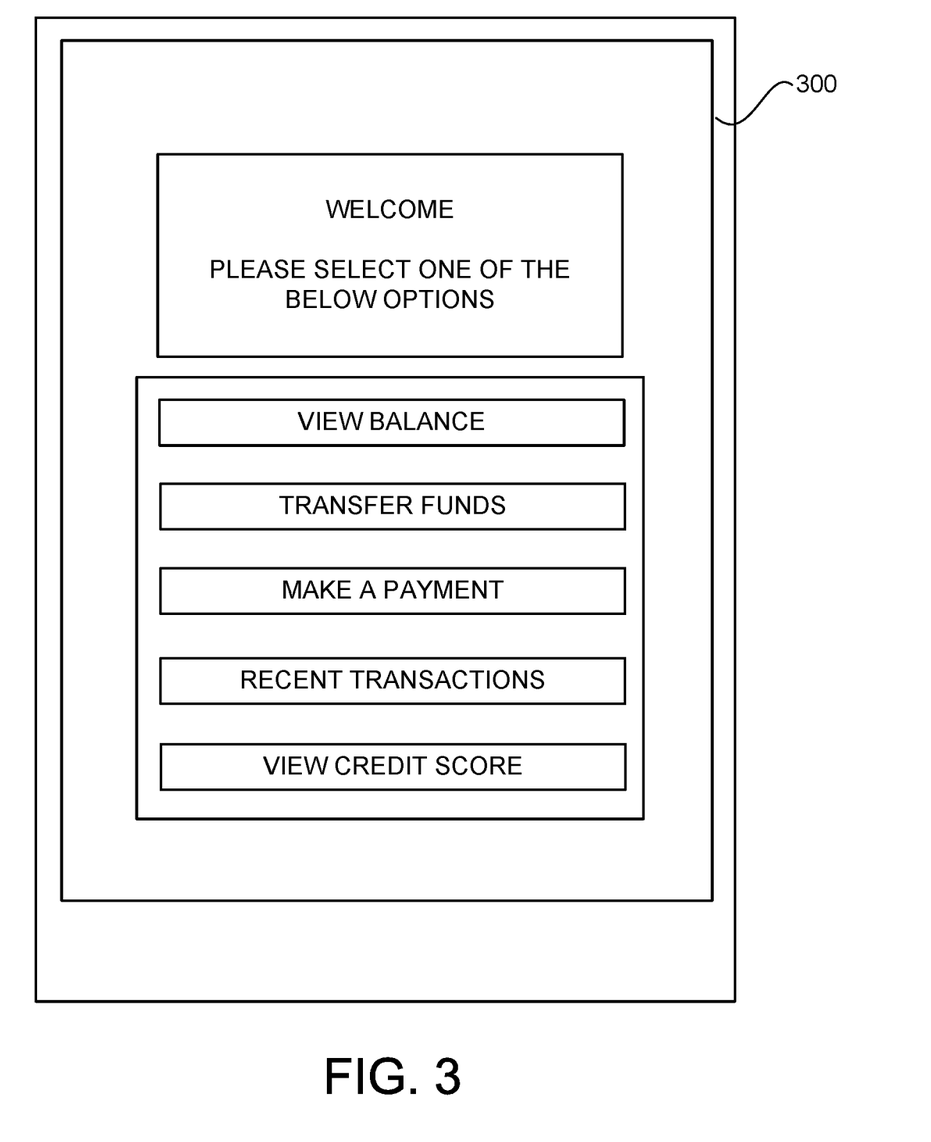
FIG. 3 illustrates a screenshot of a non-personalized welcome page, in accordance with various embodiments.

Referring to FIG. 3, a non-personalized welcome page GUI 300 is illustrated according to various embodiments. The user may be presented with a plurality of functions which the user may select. For example, the functions may include "view balance," "transfer funds," "make a payment," "recent transactions," or "view credit score." For the non-personalized welcome page, the plurality of functions may be the same for each user who accesses the welcome page, even if the user has provided login credentials.

Figure 4:
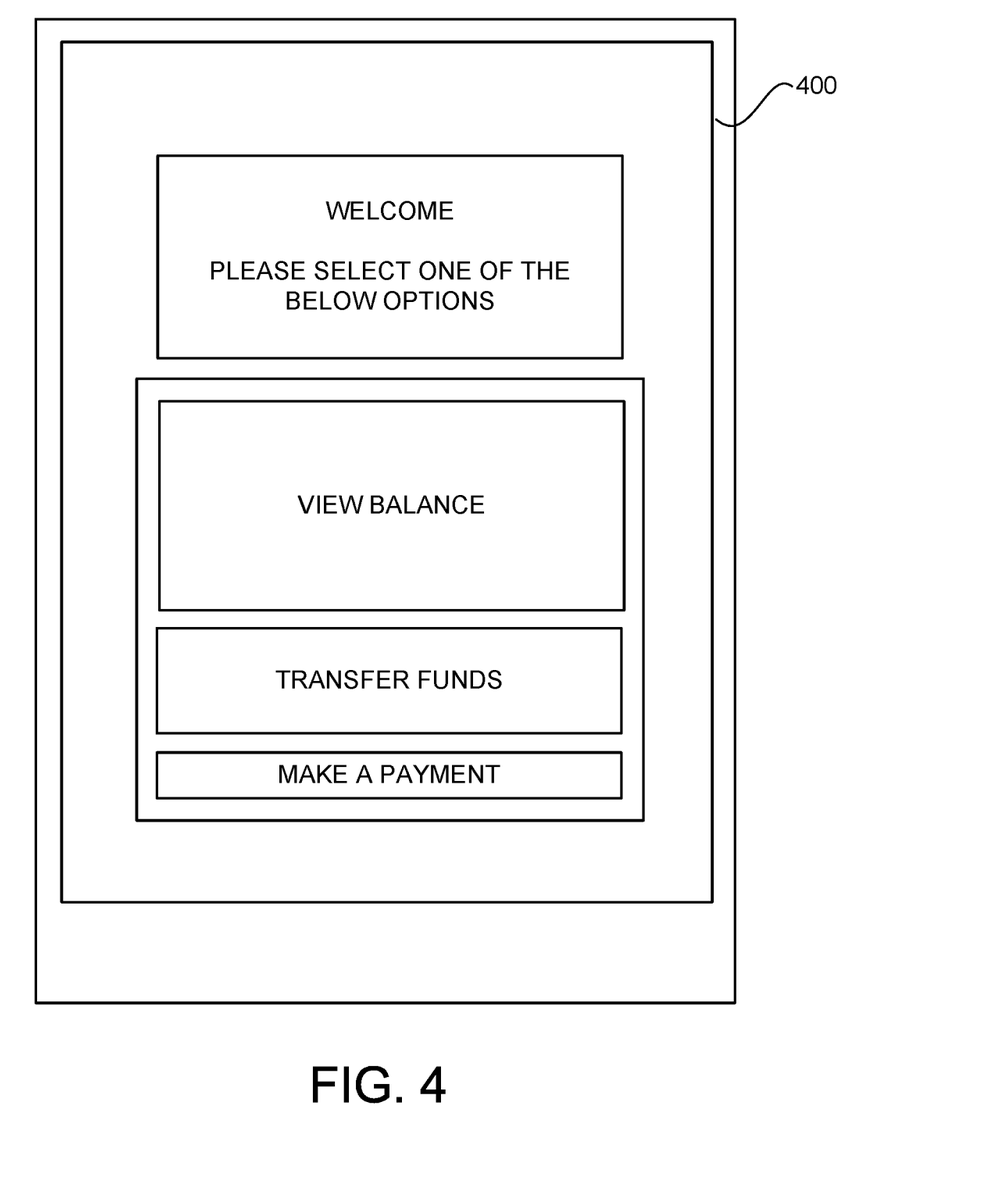
FIG. 4 illustrates a screenshot of a personalized welcome page, in accordance with various embodiments.

Referring to FIG. 4, a personalized welcome page GUI 400 is illustrated according to various embodiments. After a user submits login credentials, a content provider may determine whether the user should be provided with personalization services. In response to determining that the user should be provided with personalized content, the content provider may determine which functions the user is likely to user. In various embodiments, the content provider may provide a fixed number of functions, such as three, and the content provider may provide the three functions most likely to be used by the user. In various embodiments, the content provider may provide all functions which the user is likely to use above a threshold percentage. For example, the content provider may provide all functions which the user is more than 10% likely to use during a session.

The content provider may determine that the user is most likely to use a "view balance" function, a "transfer funds" function, and a "make a payment" function. The content provider may determine that the user is 50% likely to use the "view balance" function, 30% likely to use the "transfer funds" function, and 20% likely to use the "make a payment" function. In various embodiments, the most likely to be used functions may be displayed with a larger button (e.g. greater number of pixels), or otherwise distinguished, such as a larger font, bolded, different font, brighter color, highlighted, etc. As illustrated, the most likely to be used function is presented with the largest button, the second most likely to be used function is presented with the second largest button, and the third most likely to be used function is presented with the smallest button of the three. Thus, the GUI may utilize the available pixel space more efficiently, such that the most important features take up relatively more space and are more easily seen and selected by the user in comparison to less frequently used features.

In response to the user selecting one of the features, such as the "view balance" function, the GUI may present a "view balance" interface to the user. Similarly to the welcome screen, the "view balance" may include personalized functions or data which is likely to be used by the user. Similarly, each webpage accessed by the user may be personalized with various functions and content relevant to the user. Thus, the content provider may provide a user with personalized content, which reduces the number of screens a user may need to click through to access relevant data. In this manner, the processing loads placed on application servers may be reduced. Additionally, the available space on GUIs may be better utilized to deliver relevant content to the user without including irrelevant content which may take up screen space.

Those skilled in the art will appreciate that the specific examples provided herein are just some examples of the many types of requests, data fields, and uses of a personalization system which anticipates and injects content into a session with a user. By anticipating the user's requests and needs, the personalization system may more quickly provide useful content to the user, as well as provide content which the user would not otherwise receive.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with," "identify" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at predetermined intervals, periodic, randomly, once, more than once, or in response to a suitable request or action. Any of the information may be distributed and/or accessed via a software enabled link, wherein the link may be sent via an email, text, post, social network input and/or any other method known in the art.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors. The merchant may make API calls to retrieve available context for customers of interest.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as user devices discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE®

CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID") used to identify a device and/or user in the context of BLE. The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like.

Moreover, the "transactions" or "purchases" discussed herein may be associated with an item. Furthermore, a "reward" may be an item.

Any databases discussed herein may include relational, hierarchical, graphical, or object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® Applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

In various embodiments, the system and method may include alerting a merchant when a user device is on site. The system may include generating customized information and alerting a merchant that the information can be accessed from a merchant device. The alerts are generated by detecting a user presence at a merchant location and building information alerts and formatting the alerts based upon merchant preference information. The alerts may be transmitted to a merchant device which, when connected to the computer, causes the computer to auto-launch an application to display contextual services to the user. More particularly, the method may comprise providing a viewer application to a user for installation on the remote user device; receiving contextual services at the user device sent from a data source over the Internet, the transmission server comprising a microprocessor and a memory that stores the user's preferences for contextual services, destination address, specified information, wherein the microprocessor filters the received information by comparing requests for contextual services to user permissions; generates contextual service message; and transmits the contextual service message over a wireless communication channel to a user device associated with the user based upon the destination address and transmission schedule, wherein the alert activates the application to cause the contextual services to display on the user device.

In various embodiments, the system may also address the problem of retaining control over customers during affiliate purchase transactions, using a system for co-marketing the "look and feel" of the context services interfaces with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information.

The server constructs a composite web page using the retrieved "look and feel" information of the host web page, with the product-related content embedded within it, so that the composite web page is visually perceived by the customer as associated with the host web page. The server then transmits and presents this composite web page to the customer so that they effectively remain on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers.

More particularly, the system may be useful in an outsource provider serving web pages offering contextual services. The computer store containing data, for each of a plurality of merchant web pages and contexts, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page and/or contextual services; and using the data retrieved, automatically generate and transmit to the web browser a second web page that displays: information associated with the commerce object associated with the link that has been activated, and the plurality of visually perceptible elements visually corresponding to the source page and/or contextual services.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    calculating, by a computer-based system, an affinity score of a user representing a value of the user to a provider, the affinity score being calculated based at least in part on at least one of: a monetary spending capability of the user or an average monetary spending amount of the user over a time period;
    dynamically determining, by the computer-based system, a threshold level for providing personalization services based at least in part on an available processing power in the computer-based system, wherein the threshold level is lowered or raised based on the available processing power;
    determining, by the computer-based system, that the affinity score is greater than the threshold level;
    providing, by the computer-based system and in response to the affinity score being lower than the threshold level, non-personalization services to the user, wherein the non-personalization services include providing a non-personalized version of a webpage to the user; and
    providing, by the computer-based system and in response to the affinity score being greater than the threshold level, the personalization services to the user, wherein the personalization services include providing a personalized version of the webpage to the user, wherein providing the personalization services to the user further comprises:
        selecting, by the computer-based system and based at least in part on clickstream data of the user, a first link corresponding to a first function;
        determining, by the computer-based system, an available display area on a device of the user;
        calculating, by the computer-based system, a first size of the first link based at least in part on the available display area; and
        causing, by the computer-based system, the first link to be presented to the user.

2. The method of claim 1, wherein the affinity score is calculated in response to the computer-based system authenticating credentials for the user, wherein the personalized version of the webpage comprises a personalized welcome page to a website of the provider, wherein the personalized welcome page provides selectable links to functions of the website that the user is likely to select, wherein the selectable links include the first link, wherein the personalized welcome page for the website is unavailable for users having an affinity score lower than the threshold level.

3. The method of claim 1, wherein providing the personalization services to the user further comprises selecting, by the computer-based system and based at least in part on the clickstream data, a second link corresponding to a second function.

4. The method of claim 3, wherein providing the personalization services to the user further comprises determining, by the computer-based system, that the user is more likely to select the first link than the second link.

5. The method of claim 4, wherein providing the personalization services to the user further comprises causing, by the computer-based system, the first link to be presented in a greater size than the second link.

6. The method of claim 5, wherein providing the personalization services to the user further comprises:
    calculating, by the computer-based system, a second size of the second link, such that the first link and the second link fill the available display area.

7. The method of claim 6, wherein the first size is proportional to a first likelihood that the user is going to select the first link, and wherein the second size is proportional to a second likelihood that the user is going to select the second link.

8. A computer-based system, comprising:
    a processor; and
    a tangible, non-transitory memory configured to communicate with the processor, the tangible, non-transitory memory having instructions stored thereon that, in response to execution by the processor, cause the processor to perform operations comprising:
        calculating, by the processor, an affinity score of a user representing a value of the user to a provider, the affinity score being calculated based at least in part on at least one of: a monetary spending capability of the user or an average monetary spending amount of the user over a time period;
        dynamically determining, by the processor, a threshold level for providing personalization services based at least in part on an available processing power in the processor, wherein the threshold level is lowered or raised based on the available processing power;
        determining, by the processor, that the affinity score is greater than the threshold level;
        providing, by the processor and in response to the affinity score being lower than the threshold level, non-personalization services to the user, wherein the non-personalization services include providing a non-personalized version of a webpage to the user; and
        providing, by the processor and in response to the affinity score being greater than the threshold level, the personalization services to the user, wherein the personalization services include providing a personalized version of the webpage to the user, wherein providing the personalization services to the user further comprises:
- selecting, by the processor and based at least in part on clickstream data of the user, a first link corresponding to a first function;
- determining, by the processor, an available display area on a device of the user;
- calculating, by the processor, a first size of the first link based at least in part on the available display area; and
- causing, by the processor, the first link to be presented to the user.

9. The computer-based system of claim 8, wherein the affinity score is calculated in response to the computer-based system authenticating credentials for the user.

10. The computer-based system of claim 8, wherein providing the personalization services to the user further comprises selecting, by the processor and based at least in part on the clickstream data, a second link corresponding to a second function.

11. The computer-based system of claim 10, wherein providing the personalization services to the user further comprises determining, by the processor, that the user is more likely to select the first link than the second link.

12. The computer-based system of claim 11, wherein providing the personalization services to the user further comprises presenting, by the processor, the first link in a greater size than the second link.

13. The computer-based system of claim 12, wherein providing the personalization services to the user further comprises:
- calculating, by the processor, a second size of the second link, such that the first link and the second link fill the available display area.

14. The computer-based system of claim 13, wherein the first size is proportional to a first likelihood that the user is going to select the first link, and wherein the second size is proportional to a second likelihood that the user is going to select the second link.

15. An article of manufacture including a non-transitory, tangible computer readable storage medium having instructions stored thereon that, in response to execution by a computer-based system, cause the computer-based system to perform operations comprising:
- calculating, by the computer-based system, an affinity score of a user representing a value of the user to a provider, the affinity score being calculated based at least in part on at least one of: a monetary spending capability of the user or an average monetary spending amount of the user over a time period;
- dynamically determining, by the computer-based system, a threshold level for providing personalization services based at least in part on an available processing power in the computer-based system, wherein the threshold level is lowered or raised based on the available processing power;
- determining, by the computer-based system, that the affinity score is greater than the threshold level;
- providing, by the computer-based system and in response to the affinity score being lower than the threshold level, non-personalization services to the user, wherein the non-personalization services include providing a non-personalized version of a webpage to the user; and
- providing, by the computer-based system and in response to the affinity score being greater than the threshold level, the personalization services to the user, wherein the personalization services include providing a personalized version of the webpage to the user, wherein providing the personalization services to the user further comprises:
  - selecting, by the computer-based system and based at least in part on clickstream data of the user, a first link corresponding to a first function;
  - determining, by the computer-based system, an available display area on a device of the user;
  - calculating, by the computer-based system, a first size of the first link based at least in part on the available display area; and
  - causing, by the computer-based system, the first link to be presented to the user.

16. The article of manufacture of claim 15, wherein the affinity score is calculated in response to the computer-based system authenticating credentials for the user.

17. The article of manufacture of claim 15, wherein providing the personalization services to the user further comprises selecting, by the computer-based system and based at least in part on the clickstream data, a second link corresponding to a second function.

18. The article of manufacture of claim 17, wherein providing the personalization services to the user further comprises determining, by the computer-based system, that the user is more likely to select the first link than the second link.

19. The article of manufacture of claim 18, wherein providing the personalization services to the user further comprises causing, by the computer-based system, the first link to be presented in a greater size than the second link.

20. The article of manufacture of claim 19, wherein providing the personalization services to the user further comprises:
- calculating, by the computer-based system, a second size of the second link, such that the first link and the second link fill the available display area.

* * * * *